M. L. YUSTER.
AUTOMOBILE COMBINATION LOCK.
APPLICATION FILED JUNE 27, 1908.
931,981.
Patented Aug. 24, 1909.
2 SHEETS—SHEET 1.
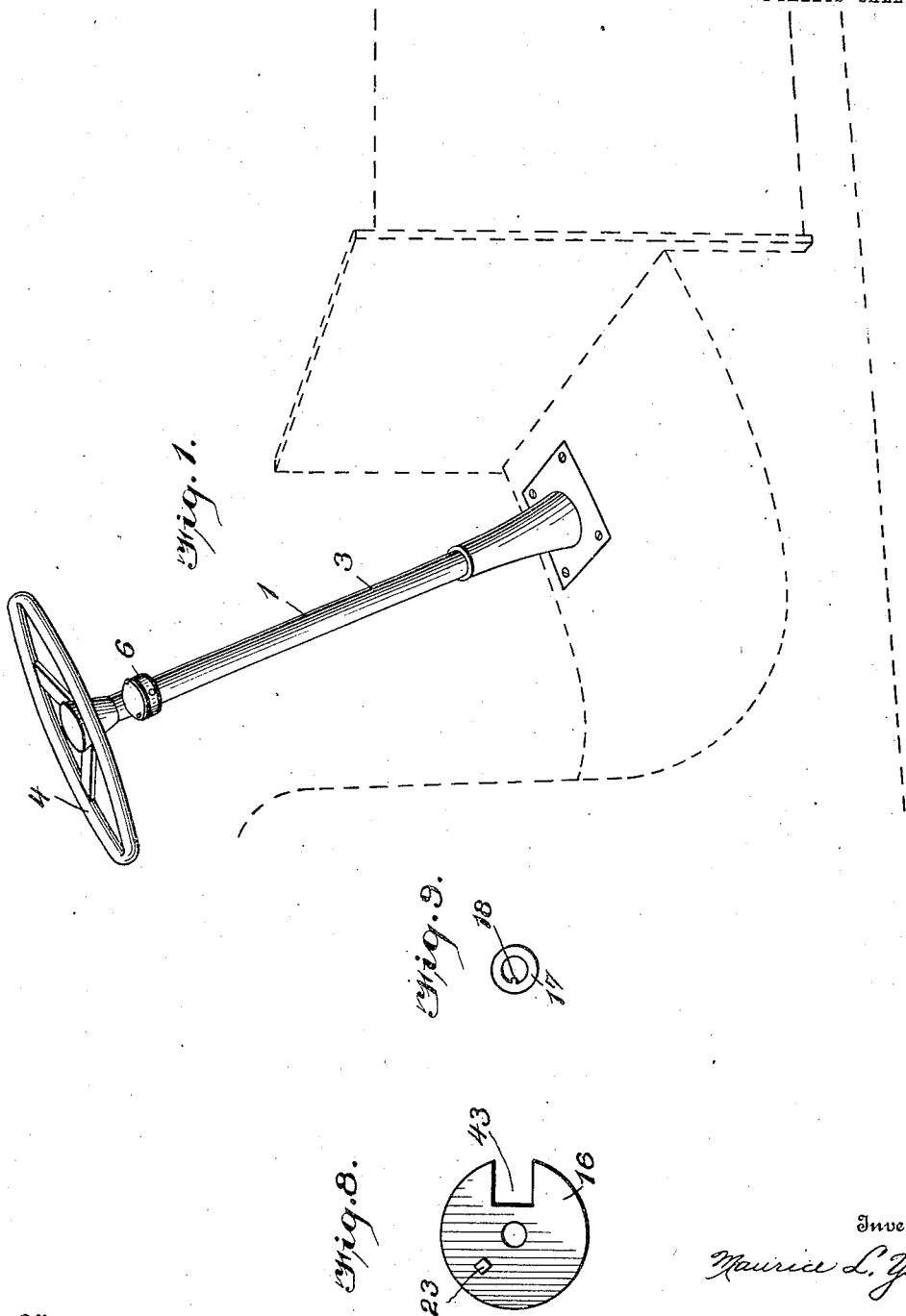
Witnesses
J. P. Britt
E. C. Duffy
Inventor
Maurice L. Yuster
By
Attorney M. L. YUSTER.
AUTOMOBILE COMBINATION LOCK.
APPLICATION FILED JUNE 27, 1908.
931,981.
Patented Aug. 24, 1909.
2 SHEETS—SHEET 2.
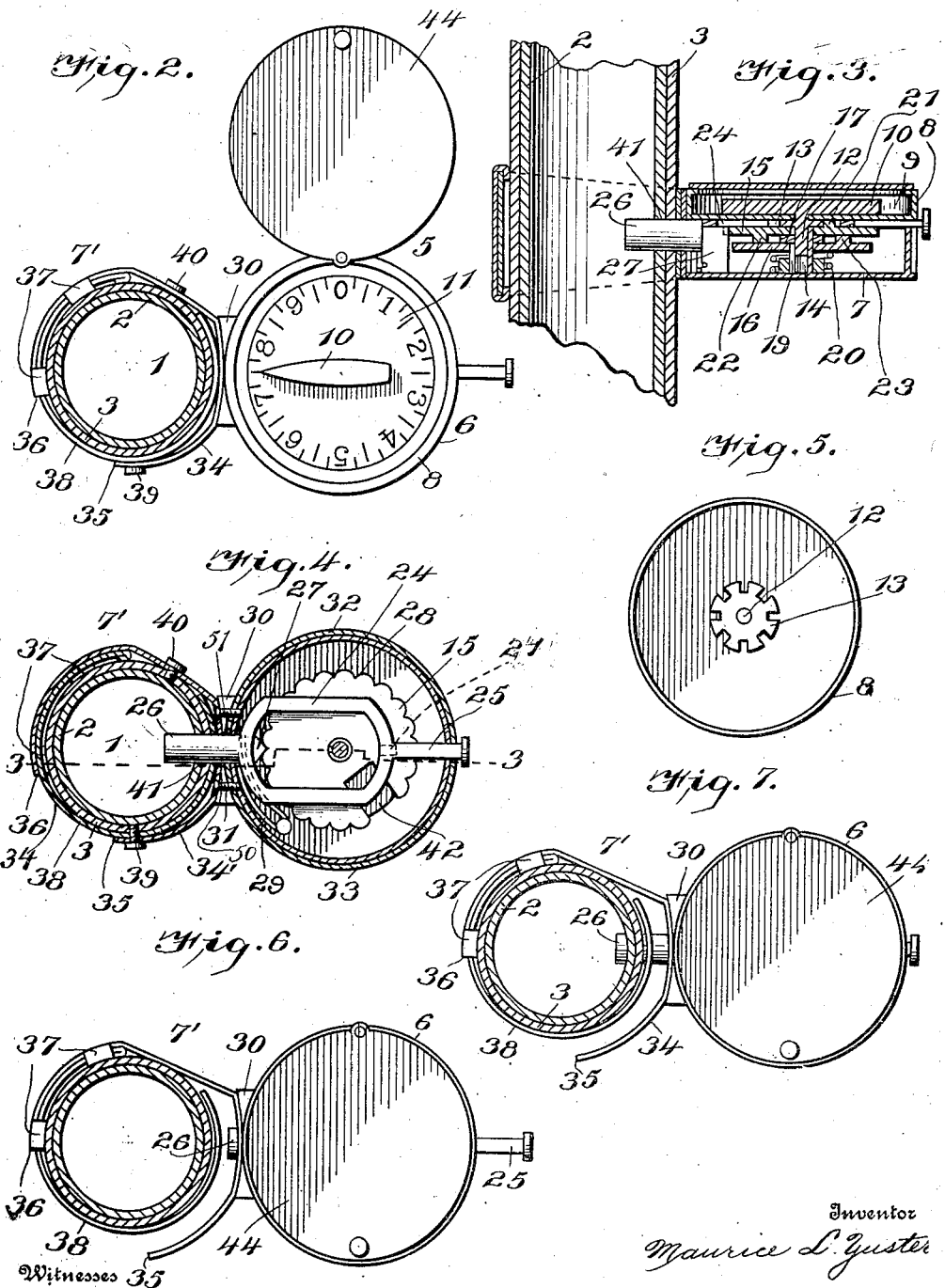
Witnesses
T. P. Britt
E. C. Duffy
Inventor
Maurice L. Yuster
By O. E. Duppzesau
Attorneys

UNITED STATES PATENT OFFICE.

MAURICE L. YUSTER, OF ROCHESTER, INDIANA, ASSIGNOR OF ONE-HALF TO OMAR B. SMITH, OF ROCHESTER, INDIANA.

AUTOMOBILE COMBINATION-LOCK.

931,981.  Specification of Letters Patent.  Patented Aug. 24, 1909.

Application filed June 27, 1908. Serial No. 440,711.

*To all whom it may concern:*

Be it known that I, MAURICE L. YUSTER, a citizen of the United States, residing at Rochester, in the county of Fulton and State of Indiana, have invented certain new and useful Improvements in Automobile Combination-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to the class of locks but more particularly to a device for locking the steering column of an automobile or the like in such manner that the steering column cannot be operated while the device is in a locked position, thus effectually preventing further use or employment of the machine until the device has been unlocked.

A further object of my invention is to provide a device for locking the steering column of automobiles or the like which is particularly simple in its construction, cheap and easy to manufacture, strong, durable and efficient.

With these objects in view my invention consists in the novel construction of the lock and in the novel construction employed for attaching the same to the steering column of an automobile.

My invention also consists in certain other novel features of construction and in combination of parts, all of which will be first fully described and afterward specifically pointed out in the appended claims.

Referring to the accompanying drawings: Figure 1 is a perspective view of the steering column of an automobile illustrating my device in operative position thereon. Fig. 2 is a transverse sectional view taken through the steering column showing the lock in plan. Fig. 3 is a vertical sectional view taken through the steering column and through the lock, said view being taken on line 3—3 of Fig. 4. Fig. 4 is a transverse sectional view through the steering column and lock. Fig. 5 is a bottom plan of the lock cap. Fig. 6 is a transverse sectional view through the steering column showing the dial cover over the dial and illustrating the device unlocked. Fig. 7 is a similar view showing the device locked. Fig. 8 is a plan view of the lower tumbler, and Fig. 9 is a plan of the washer.

Like numerals of reference indicate the same parts throughout the several figures in which:

1 indicates the steering column of an automobile which comprises the inner tube or column 2 and the outer tube or column 3, it being usual in the construction of steering columns of automobiles to arrange the outer column 3 stationary and have the inner column 2 rotate within the outer column 3, said inner column 2 being attached to a steering wheel 4 or other analogous device.

5 indicates the locking device which comprises the permutation lock 6 and the connecting arrangement 7 for securing the lock 6 to the steering column 1.

Referring now to Figs. 2, 3 and 4 it will be seen that the lock 6 comprises a casing 7 and a cap 8, said cap, as shown in Fig. 3, is provided with a recess 9 within which is accommodated a pointer 10, said pointer 10 being arranged directly above the dial 11 which is formed on the cap 8. A central post 12 formed on said pointer 10 enters the body of the lock 6 and carries thereon a notched or toothed disk 13 (Fig. 5). As will appear from Fig. 3 a tube 14 extending upwardly from the bottom of the casing 7 receives the central post 12, and on said sleeve 14 are mounted the upper toothed tumbler 15 and the lower tumbler 16, a washer 17 being interposed between said two tumblers, said washer 17 (Fig. 9) being provided with a projection 18 which enters a slot 19 in the tube 14, thus preventing said washer 17 from rotating on the tube 14. It will also be seen from Fig. 3 that a small spiral spring 20 is provided under the lower tumbler 16, said spring normally holding the said tumblers in a proper relative position. Formed on the upper toothed tumbler 15 as clearly shown in Figs. 3 and 4 is a lug or projection 21, said lug or projection entering one of the notches in the notched disk 13 on the central post 12; while said toothed tumbler 15 is also provided with a smaller lug or projection 22 formed on the bottom face of said tumbler, said lug or projection 22 being arranged in the path of a similar lug or projection 23 formed on the upper face of the lower tumbler 16 as clearly shown in Fig. 3. Arranged between the upper toothed tumbler and the cap 8 is a slide 24 (Fig. 4), said slide 24 comprising a push rod 25 and a locking bolt 26, said slide having a V-shaped dog 27 formed thereon, said V-shaped dog 27 being normally in engagement with the toothed periphery 28 of the toothed tumbler 15. As will appear from the drawings the push rod 25 extends through the lock casing in such manner that the slide and locking bolt 26 can be operated by the push rod. Referring now to Fig. 4 it will be seen that a small leaf spring 29 arranged within the lock casing is normally in engagement with the V-shaped dog 27, said spring holding the dog 27 in engagement with the toothed periphery 28 of the tumbler 15.

Referring now to the means for securing the lock to the steering column it will be seen that I provide a base piece 30 (Fig. 4) and secure same to the lock by means of two small screws 31, said screws entering the flange 32 of the cap and passing into the flange or wall 33 of the casing 7, thus securely locking the cap 8 in position on the casing 7 in such manner that the cap cannot be removed while the device is in position on the steering column of an automobile. Connected to said base piece 30 by means of the screws 31 is a flexible metal strap 34, which comprises the portion 34' and the portion 38, the portion 34' partially surrounding the steering column and passing from the point 35 to the point 36.

Referring now to Figs. 2, 6 and 7 it will be seen that a slide connection 37 is provided between the strap portion 34' and the strap portion 38, which strap portion 38 passes around the steering column and under the strap portion 34', as clearly shown in Fig. 4, two screws 39 and 40 being provided for securing the said strap portions 34' and 38 rigidly in position on the outer tube or column 3 of the steering column 1.

Referring now to Figs. 3 and 4 it will be seen that a perforation 41 is provided in the outer tube or column 3 and the inner tube or column 2 in such manner that the locking bolt 26 enters the said perforation securely locking the device or columns 2 and 3 against relative movement. It will also appear from Figs. 4 and 7 that the straps 34 and 38 are perforated at 50 and 51 in order to allow the locking bolt 26 to pass therethrough and into the steering column 1.

Referring now to Figs. 4 and 8 it will be seen that the toothed tumbler 15 is provided with a notch or recess 42 in the periphery of said tumbler, while the lower tumbler 16 (Fig. 8) is provided with a similar notch or recess 43.

Having thus fully described the several parts of my invention its operation is as follows: After the perforation 41 has been made in the steering column of the automobile the device is secured to the column in the following manner: The lock is manipulated in the manner as will be presently described in order to have the locking bolt 26 in an unlocked position as shown in Fig. 6. The strap portions 34 and 38 are then passed around the steering column in the manner as illustrated in Fig. 6, and the screws 39 and 40 applied thereto in order to securely hold the said strap portions 34 and 38 in position shown in Fig. 2. When the straps are in this position the lock is manipulated in order to allow the locking bolt 26 to pass through the said strap portions 34 and 38 and into the steering column 1 as shown in Fig. 7. When the locking bolt 26 is in this position the strap portions 34 and 38 can not be removed from the steering column as long as the locking bolt 26 is in position shown in Fig. 7. In order to operate the lock the pivoted cover 44 is swung into position shown in Fig. 2 so that the pointer 10 is accessible. Said pointer is then turned, which operation rotates the toothed tumbler 15. As the periphery of said tumbler 15 passes under the V-shaped dog 27 a clicking sound is given out in such manner that the extent of movement of the pointer 10 can be determined without looking at the dial 11 which also allows the device to be operated in dark, for the reason that the number of clicks when once known can be counted so that the lock can be operated by counting the number of clicks. When the toothed tumbler 15 is rotated the lug or projection 22 on the bottom surface thereof engages the lug or projection 23 on the lower tumbler 16 rotating said lower tumbler. The pointer 10 is rotated until the notch or recess 43 in the periphery of the lower tumbler 16 is brought directly in front of the V-shaped dog 27. The extent of movement of the pointer 10 in order to bring the tumbler 16 into this position is of course known to the operator of the lock. As soon as the tumbler 16 assumes this position the pointer 10 is rotated in the opposite direction, which rotation carries the toothed tumbler 15 until the notch or recess 42 therein lies directly in front of the V-shaped dog 27 and directly above the notch or recess 43 in the lower tumbler 16. As soon as the toothed tumbler 15 assumes this position the leaf spring 29 acting on the V-shaped dog 27 carries said dog within the recesses 42 and 43 in the tumblers 15 and 16 carrying the locking bolt 26 within the casing as shown in Fig. 6, thus unlocking the steering column. In order to again lock the steering column the push rod 25 is forced into position shown in Fig. 4 and the pointer 10 given a turn. This immediately carries the notch 42 in the toothed tumbler 15 out of line with the V-shaped dog 27 and throws the periphery 28 of the toothed tumbler 15 into engagement with the V-shaped dog 27, thus securely maintaining the locking bolt 26 in a locked position and within the steering column as clearly shown in Fig. 4.

Having thus fully described my invention what I claim as new and desire to secure by Letters Patent of the United States, is:

1. A device for locking the steering column of an automobile or the like comprising a lock, a strap to which said lock is secured, a locking bolt adapted to be passed into the steering column, said strap being provided with perforations through which said locking bolt is adapted to pass, the whole arranged in such manner that the said strap is locked around the steering column by the said locking bolt.

2. A device for locking the steering column of an automobile or the like comprising a permutation lock, a strap to which said lock is secured, said strap encompassing the steering column, a locking bolt in said lock adapted to pass into the steering column to lock the same, each end of said strap being provided with means for receiving said locking bolt to lock said strap on the steering column.

In testimony whereof, I affix my signature, in presence of two witnesses.

MAURICE L. YUSTER.

Witnesses:
   B. F. Musser,
   I. M. Wile.